US009764848B1

(12) United States Patent
Vondrell et al.

(10) Patent No.: US 9,764,848 B1
(45) Date of Patent: Sep. 19, 2017

(54) PROPULSION SYSTEM FOR AN AIRCRAFT

(71) Applicant: General Electric Company, Schenectady, NY (US)

(72) Inventors: Randy M. Vondrell, Cincinnati, OH (US); Matthew Ryan Polakowski, West Chester, OH (US); Kurt David Murrow, Liberty Township, OH (US); Glenn Crabtree, Oregonia, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/245,257

(22) Filed: Aug. 24, 2016

Related U.S. Application Data

(60) Provisional application No. 62/304,450, filed on Mar. 7, 2016.

(51) Int. Cl.
| | |
|---|---|
| B64D 27/02 | (2006.01) |
| B64D 27/18 | (2006.01) |
| B64D 27/24 | (2006.01) |
| B64C 11/30 | (2006.01) |
| B64D 41/00 | (2006.01) |
| F01D 15/10 | (2006.01) |

(52) U.S. Cl.
CPC .............. *B64D 27/18* (2013.01); *B64C 11/30* (2013.01); *B64D 27/24* (2013.01); *B64D 41/00* (2013.01); *F01D 15/10* (2013.01); *B64D 2027/026* (2013.01); *B64D 2221/00* (2013.01)

(58) Field of Classification Search
USPC ............................................. 244/55, 60, 65
See application file for complete search history.

(56) References Cited

U.S. PATENT DOCUMENTS

| | | | | |
|---|---|---|---|---|
| 2,462,201 A | * | 2/1949 | Kilgore | B64D 27/24 244/60 |
| 2,812,912 A | | 11/1957 | Stevens et al. | |
| 3,194,516 A | | 7/1965 | Messerschmitt | |
| 3,286,470 A | | 11/1966 | Gerlaugh | |

(Continued)

FOREIGN PATENT DOCUMENTS

| | | |
|---|---|---|
| EP | 2581308 A2 | 4/2013 |
| GB | 1024894 A | 4/1966 |

(Continued)

OTHER PUBLICATIONS http://aviationweek.com/awin/boeing-researches-alternative-propulsion-and-fuel-options, Aviation Week & Space Technology, Jun. 4, 2012.

(Continued)

*Primary Examiner* — Christopher P Ellis
(74) *Attorney, Agent, or Firm* — GE Global Patent Operation; William S. Munnerlyn

(57) ABSTRACT

A propulsion system for an aircraft includes an electric generator and a turbomachine. The turbomachine is configured to be mounted to a first wing of the aircraft and is operable with the electric generator. The propulsion system additionally includes a first propulsor mechanically coupled to a shaft of the turbomachine and a second propulsor assembly configured to be mounted at a location away from the turbomachine and the first propulsor. The electric generator is in electrical communication with the second propulsor assembly for powering the second propulsor assembly.

20 Claims, 4 Drawing Sheets

(56) References Cited

U.S. PATENT DOCUMENTS

| | | | |
|---|---|---|---|
| 3,312,448 | A | 4/1967 | Hull, Jr. et al. |
| 3,844,110 | A | 10/1974 | Widlansky et al. |
| 4,089,493 | A | 5/1978 | Paulson |
| 4,370,560 | A | 1/1983 | Faulkner et al. |
| 4,605,185 | A * | 8/1986 | Reyes .................... B64D 27/24 244/55 |
| 4,913,380 | A | 4/1990 | Verdaman et al. |
| 5,174,109 | A | 12/1992 | Lampe |
| 5,799,484 | A | 9/1998 | Nims |
| 5,927,644 | A | 7/1999 | Ellis et al. |
| 6,105,697 | A | 8/2000 | Weaver |
| 6,169,332 | B1 | 1/2001 | Taylor et al. |
| 6,545,373 | B1 | 4/2003 | Andres et al. |
| 6,834,831 | B2 | 12/2004 | Daggett |
| 6,976,655 | B2 | 12/2005 | Thompson |
| 6,992,403 | B1 | 1/2006 | Raad |
| 7,251,942 | B2 | 8/2007 | Dittmar et al. |
| 7,267,300 | B2 | 9/2007 | Heath et al. |
| 7,285,871 | B2 | 10/2007 | Derouineau |
| 7,380,749 | B2 | 6/2008 | Fucke et al. |
| 7,387,189 | B2 | 6/2008 | James et al. |
| 7,417,337 | B1 | 8/2008 | Suttie |
| 7,493,754 | B2 | 2/2009 | Moniz et al. |
| 7,495,354 | B2 | 2/2009 | Herrmann |
| 7,514,810 | B2 | 4/2009 | Kern et al. |
| 7,528,499 | B2 | 5/2009 | Suttie |
| 7,665,689 | B2 | 2/2010 | McComb |
| 7,677,502 | B2 | 3/2010 | Lawson et al. |
| 7,752,834 | B2 | 7/2010 | Addis |
| 7,806,363 | B2 | 10/2010 | Udall et al. |
| 7,818,969 | B1 | 10/2010 | Hotto |
| 7,819,358 | B2 | 10/2010 | Belleville |
| 7,905,449 | B2 | 3/2011 | Cazals et al. |
| 7,952,244 | B2 | 5/2011 | Colin |
| 7,958,727 | B2 | 6/2011 | Arnold |
| 7,970,497 | B2 | 6/2011 | Derouineau et al. |
| 7,976,273 | B2 | 7/2011 | Suciu et al. |
| 8,016,228 | B2 | 9/2011 | Fucke et al. |
| 8,033,094 | B2 | 10/2011 | Suciu et al. |
| 8,039,983 | B2 | 10/2011 | Cote et al. |
| 8,099,944 | B2 | 1/2012 | Foster et al. |
| 8,109,073 | B2 | 2/2012 | Foster et al. |
| 8,128,019 | B2 | 3/2012 | Annati et al. |
| 8,141,360 | B1 | 3/2012 | Huber |
| 8,162,254 | B2 | 4/2012 | Roche |
| 8,193,761 | B1 | 6/2012 | Singh |
| 8,220,739 | B2 | 7/2012 | Cazals |
| 8,226,040 | B2 | 7/2012 | Neto |
| 8,291,716 | B2 | 10/2012 | Foster et al. |
| 8,317,126 | B2 | 11/2012 | Harris et al. |
| 8,432,048 | B1 | 4/2013 | Paulino |
| 8,469,306 | B2 * | 6/2013 | Kuhn, Jr. ............ B64C 29/0033 244/12.4 |
| 8,489,246 | B2 | 7/2013 | Dooley |
| 8,492,920 | B2 | 7/2013 | Huang et al. |
| 8,522,522 | B2 | 9/2013 | Poisson |
| 8,549,833 | B2 | 10/2013 | Hyde et al. |
| 8,552,575 | B2 | 10/2013 | Teets et al. |
| 8,568,938 | B2 | 10/2013 | Gao et al. |
| 8,596,036 | B2 | 12/2013 | Hyde et al. |
| 8,631,657 | B2 | 1/2014 | Hagen et al. |
| 8,640,439 | B2 | 2/2014 | Hoffjann et al. |
| 8,657,227 | B1 | 2/2014 | Bayliss et al. |
| 8,672,263 | B2 | 3/2014 | Stolte |
| 8,684,304 | B2 | 4/2014 | Burns et al. |
| 8,692,489 | B2 | 4/2014 | Maalioune |
| 8,708,274 | B2 * | 4/2014 | Lord .................... B64D 27/14 244/55 |
| 8,720,814 | B2 | 5/2014 | Smith |
| 8,723,349 | B2 | 5/2014 | Huang et al. |
| 8,723,385 | B2 | 5/2014 | Jia et al. |
| 8,742,605 | B1 | 6/2014 | Wilhide et al. |
| 8,836,160 | B1 | 9/2014 | Paterson et al. |
| 8,857,191 | B2 | 10/2014 | Hyde et al. |
| 8,890,343 | B2 | 11/2014 | Bulin et al. |
| 8,925,660 | B2 | 1/2015 | Bowdich et al. |
| 8,928,166 | B2 | 1/2015 | Seger et al. |
| 8,939,399 | B2 | 1/2015 | Kouros et al. |
| 8,950,703 | B2 | 2/2015 | Bayliss et al. |
| 8,957,539 | B1 | 2/2015 | Ralston |
| 8,997,493 | B2 | 4/2015 | Brust et al. |
| 8,998,580 | B2 | 4/2015 | Quiroz-Hernandez |
| 9,004,849 | B2 | 4/2015 | Munsell et al. |
| 9,038,398 | B2 | 5/2015 | Suciu et al. |
| 9,045,996 | B2 | 6/2015 | Anghel et al. |
| 9,059,440 | B2 | 6/2015 | Hotto |
| 9,068,562 | B1 | 6/2015 | Budica et al. |
| 9,143,023 | B1 | 9/2015 | Uskert |
| 9,190,892 | B2 | 11/2015 | Anthony |
| 2006/0037325 | A1 | 2/2006 | Peters et al. |
| 2008/0056892 | A1 | 3/2008 | Barton et al. |
| 2009/0179424 | A1 | 7/2009 | Yaron |
| 2010/0038473 | A1 | 2/2010 | Schneider et al. |
| 2010/0083669 | A1 * | 4/2010 | Foster .................... F02C 6/18 60/802 |
| 2011/0016882 | A1 | 1/2011 | Woelke et al. |
| 2012/0119020 | A1 | 5/2012 | Burns et al. |
| 2012/0153076 | A1 | 6/2012 | Burns et al. |
| 2012/0209456 | A1 | 8/2012 | Harmon et al. |
| 2012/0214605 | A1 | 8/2012 | Snook et al. |
| 2013/0032215 | A1 | 2/2013 | Streifinger |
| 2013/0036730 | A1 | 2/2013 | Bruno et al. |
| 2013/0052005 | A1 | 2/2013 | Cloft |
| 2013/0062885 | A1 | 3/2013 | Taneja |
| 2013/0088019 | A1 | 4/2013 | Huang et al. |
| 2013/0094963 | A1 * | 4/2013 | Rolt .................... B64D 27/02 416/1 |
| 2013/0099065 | A1 | 4/2013 | Stuhlberger |
| 2013/0139515 | A1 | 6/2013 | Schlak |
| 2013/0154359 | A1 | 6/2013 | Huang et al. |
| 2013/0184958 | A1 | 7/2013 | Dyrla et al. |
| 2013/0227950 | A1 | 9/2013 | Anderson et al. |
| 2013/0251525 | A1 | 9/2013 | Saiz |
| 2013/0306024 | A1 | 11/2013 | Rolt |
| 2014/0010652 | A1 | 1/2014 | Suntharalingam et al. |
| 2014/0060995 | A1 | 3/2014 | Anderson et al. |
| 2014/0084677 | A1 | 3/2014 | Haillot |
| 2014/0151495 | A1 | 6/2014 | Kuhn, Jr. |
| 2014/0245748 | A1 | 9/2014 | Anghel et al. |
| 2014/0250861 | A1 | 9/2014 | Eames |
| 2014/0252161 | A1 | 9/2014 | Gukeisen |
| 2014/0271114 | A1 | 9/2014 | Phillips et al. |
| 2014/0283519 | A1 | 9/2014 | Mariotto et al. |
| 2014/0290208 | A1 | 10/2014 | Rechain et al. |
| 2014/0338352 | A1 | 11/2014 | Edwards et al. |
| 2014/0339371 | A1 | 11/2014 | Yates et al. |
| 2014/0345281 | A1 | 11/2014 | Galbraith |
| 2014/0346283 | A1 | 11/2014 | Salyer |
| 2014/0367510 | A1 | 12/2014 | Viala et al. |
| 2014/0367525 | A1 | 12/2014 | Salyer |
| 2014/0369810 | A1 | 12/2014 | Binks et al. |
| 2015/0005990 | A1 | 1/2015 | Burns et al. |
| 2015/0013306 | A1 | 1/2015 | Shelley |
| 2015/0014479 | A1 | 1/2015 | Bayliss et al. |
| 2015/0028594 | A1 | 1/2015 | Mariotto |
| 2015/0084558 | A1 | 3/2015 | Benson et al. |
| 2015/0084561 | A1 | 3/2015 | Benson et al. |
| 2015/0084565 | A1 | 3/2015 | Le Peuvedic |
| 2015/0089921 | A1 | 4/2015 | Rideau et al. |
| 2015/0104310 | A1 | 4/2015 | Griffin |
| 2015/0113996 | A1 | 4/2015 | Cai et al. |
| 2015/0115108 | A1 | 4/2015 | Benson et al. |
| 2015/0148993 | A1 | 5/2015 | Anton et al. |
| 2015/0151844 | A1 | 6/2015 | Anton et al. |
| 2015/0151847 | A1 | 6/2015 | Krug et al. |
| 2015/0159552 | A1 | 6/2015 | Rodriguez et al. |
| 2015/0183522 | A1 | 7/2015 | Ouellette |
| 2015/0291285 | A1 | 10/2015 | Gallet |
| 2015/0380999 | A1 | 12/2015 | Joshi et al. |
| 2016/0061053 | A1 | 3/2016 | Thomassin |
| 2016/0214717 | A1 * | 7/2016 | De Silva .................... B64D 5/00 |
| 2016/0257416 | A1 * | 9/2016 | Himmelmann ........ B64D 27/02 |

(56) References Cited

U.S. PATENT DOCUMENTS

2016/0340051 A1* 11/2016 Edwards ................ B64D 27/02
2016/0355272 A1* 12/2016 Moxon .................. B64D 35/04

FOREIGN PATENT DOCUMENTS

| GB | 2400411 A | 10/2004 |
|----|-----------|---------|
| GB | 2489311 A | 9/2012 |
| WO | WO2010/020199 A1 | 2/2010 |
| WO | 2014072615 A1 | 5/2014 |
| WO | WO2014/072615 A1 | 5/2014 |
| WO | WO2014/123740 A1 | 8/2014 |

OTHER PUBLICATIONS

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

European Search Report and Opinion issued in connection with related EP Application No. 16152115.8 on Jun. 9, 2016.

* cited by examiner

100 # PROPULSION SYSTEM FOR AN AIRCRAFT

CROSS REFERENCE TO RELATED APPLICATIONS

The present application claims filing benefit of U.S. Provisional Patent Application Ser. No. 62/304,450 having a filing date of Mar. 7, 2016 and which is incorporated herein by reference in its entirety.

FIELD OF THE INVENTION

The present subject matter relates generally to a propulsion system for an aircraft, and an aircraft including the same.

BACKGROUND OF THE INVENTION

A conventional aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing.

For small passenger aircraft, the two aircraft engines may be relatively small, low thrust generating aircraft engines. However, as is generally understood, the relatively small aircraft engines may not be as efficient as relatively large aircraft engines, given that the aircraft engines are not entirely scalable. Accordingly, a propulsion system for a small passenger aircraft capable of achieving efficiencies close to relatively large aircraft engines would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system for an aircraft is provided. The aircraft includes a first wing and a second wing. The propulsion system includes an electric generator and a turbomachine configured to be mounted to the first wing of the aircraft. The turbomachine includes a turbine section and a shaft, the shaft rotatable with at least a portion of the turbine section, and the turbomachine operable with the electric generator. The propulsion system additionally includes a first propulsor mechanically coupled to the shaft of the turbomachine, and a second propulsor assembly configured to be mounted to one of the first wing or the second wing at a location away from the turbomachine and the first propulsor. The electric generator is in electrical communication with the second propulsor assembly for powering the second propulsor assembly.

In another exemplary embodiment of the present disclosure, an aircraft is provided. The aircraft includes a fuselage, a first wing, and a second wing. The first wing and a portion of the fuselage define a first side, and the second wing and another portion of the fuselage define a second side. The aircraft additionally includes an asymmetric propulsion system. The asymmetric propulsion system includes an electric generator and a turbomachine mounted to the first side of the aircraft. The turbomachine includes a turbine section and a shaft, the shaft rotatable with at least a portion of the turbine section, and the turbomachine operable with the electric generator. The propulsion system additionally includes a first propulsor mechanically coupled to the shaft of the turbomachine, and a second propulsor assembly mounted to the second side. The electric generator is in electrical communication with the second propulsor assembly for powering the second propulsor assembly.

In an exemplary aspect of the present disclosure, a method for operating a propulsion system of an aircraft is provided. The method includes powering with a turbomachine a first propulsor in mechanical communication with the turbomachine. The turbomachine is mounted to a first side of the aircraft. The method also includes generating electrical power with an electric generator, the electric generator powered by the turbomachine. The method also includes powering a second propulsor assembly mounted to a second side of the aircraft with the electrical power generated by the electric generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
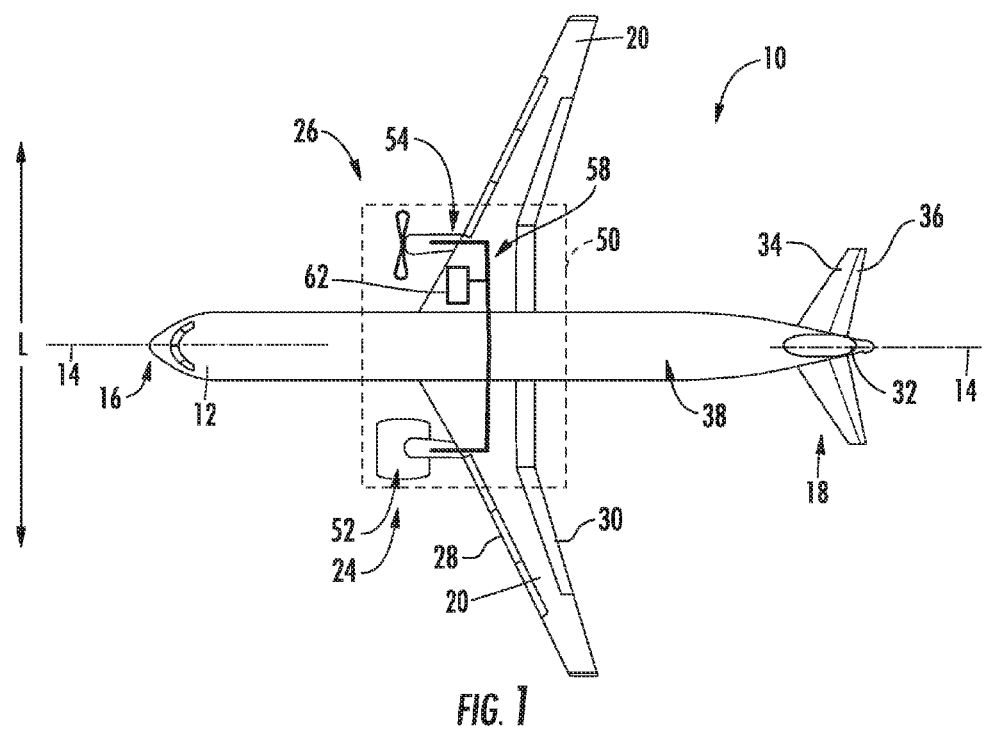
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, a first wing 20, and a second wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. In certain embodiments, the aircraft 10 may be a relatively small aircraft 10, configured for carrying, e.g., less than ten passengers. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
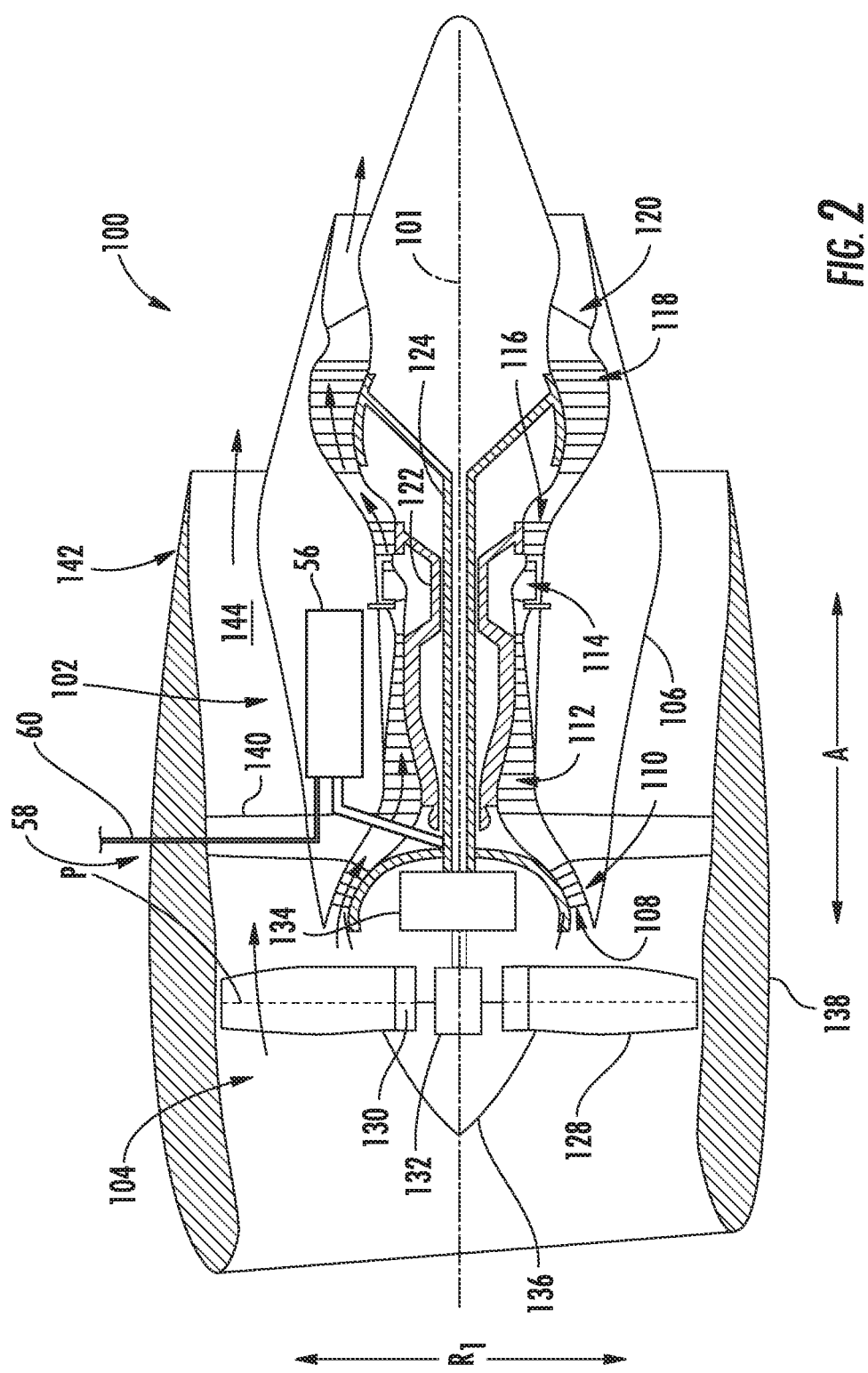
FIG. 2 is a schematic, cross-sectional view of a gas turbine engine in accordance with an exemplary embodiment of the present disclosure, which may be mounted to the exemplary aircraft of FIG. 1.
Figure 3:
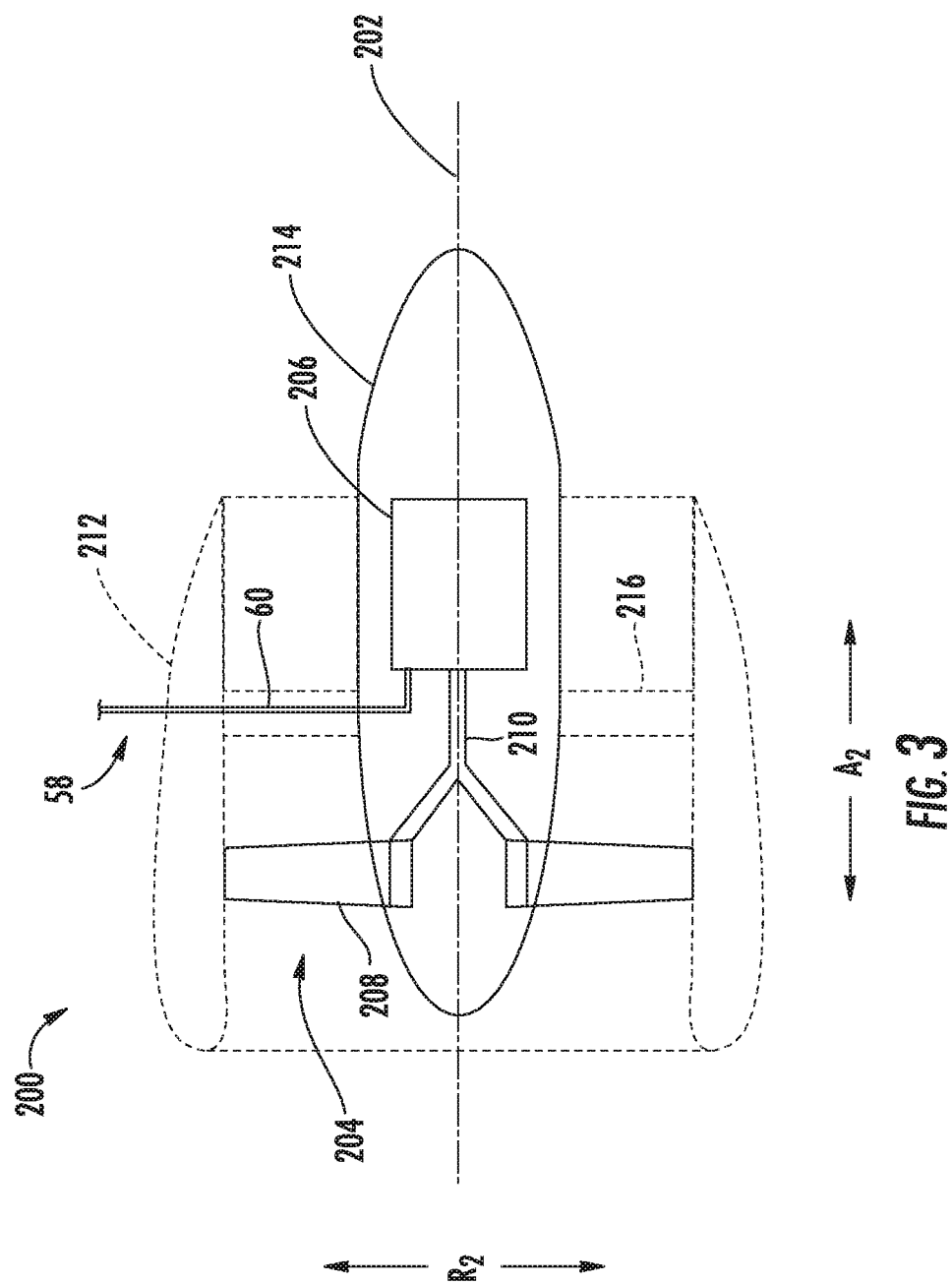
FIG. 3 is a schematic, cross-sectional view of a propulsion assembly in accordance with an exemplary embodiment of the present disclosure, which may be mounted to the exemplary aircraft of FIG. 1.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54.

Referring particularly to FIGS. 1 and 2, the first propulsor assembly 52 includes a turbomachine mounted, or configured to be mounted, to the first side 24 of the aircraft 10, or more particularly, to the first wing 20 of the aircraft 10. The first propulsor assembly 52 additionally includes a first propulsor mechanically coupled to the turbomachine. For the embodiment depicted, the turbomachine is configured as a core turbine engine 102 and the first propulsor is configured as a fan 104. Accordingly, the core turbine engine 102 and the fan 104 together form, and the first propulsor assembly 52 may generally be referred to as, a turbofan engine 100.

As shown in FIG. 2, the turbofan 100 defines an axial direction $A_1$ (extending parallel to a longitudinal centerline 101 provided for reference) and a radial direction $R_1$. As stated, the turbofan 100 includes the fan 104 and the core turbine engine 102 disposed downstream from the fan 104.

The exemplary core turbine engine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120.

The exemplary core turbine engine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

As stated, the first propulsor is configured as the fan 104 for the embodiment depicted. Further, the exemplary fan 104 is configured as a variable pitch fan having a plurality of fan blades 128 coupled to a disk 130 in a spaced apart manner. The fan blades 128 extend outwardly from disk 130 generally along the radial direction $R_1$. Each fan blade 128 is rotatable relative to the disk 130 about a pitch axis P by virtue of the fan blades 128 being operatively coupled to a suitable actuation member 132 configured to collectively vary the pitch of the fan blades 128. The fan 104 is mechanically coupled to the LP shaft 124. More particularly, the fan 104, including the fan blades 128, disk 130, and actuation member 132, is mechanically coupled to the LP shaft 124 through a power gearbox 134, and is rotatable about the longitudinal axis 106 by the LP shaft 124 across the power gear box 134. The power gear box 134 includes a plurality of gears for stepping down the rotational speed of the LP shaft 124 to a more efficient rotational fan speed.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the core turbine engine 102. Accordingly, the exemplary turbofan 100 depicted may be referred to as a "ducted" turbofan engine. It should be appreciated that the nacelle 138 may be configured to be supported relative to the core turbine engine 102 by a plurality of circumferentially-spaced outlet guide vanes 140. Moreover, a downstream section 142 of the nacelle 138 may extend over an outer portion of the core turbine engine 102 so as to define a bypass airflow passage 144 therebetween.

Referring still to FIG. 2, the propulsion system 50 additionally includes an electric generator 56, the turbomachine 100 operable with the electric generator 56. More particularly, the electric generator 56 is positioned within the core turbine engine 102 of the turbofan engine 100 and is in mechanical communication with one of the shafts of the turbofan engine 100. The electric generator 56 is configured to convert mechanical power of the one or more shafts to electric power. As depicted, in certain embodiments, the electric generator 56 may be in mechanical communication with the LP shaft 124, such that the LP shaft 124 drives the electric generator 56. It should be appreciated, however, that in other embodiments, the electric generator 56 may instead be in mechanical communication with, e.g., the HP shaft 122, such that the HP shaft 122 drives the electric generator 56. Additionally, or alternatively, the electric generator 56 may be positioned in any other suitable location within the core turbine engine 102, or elsewhere. Notably, the electric generator 56 may, in certain embodiments, be configured to function as an electric motor as well. Accordingly, with such a configuration, the electric generator 56 may additionally be capable of rotating the LP shaft 124 (and first propulsor/fan 104) of the turbofan engine 100.

Moreover, the propulsion system 50 depicted additionally includes an electrical communication bus 58 to allow the electric generator 56 to be in communication with one or more other components of the propulsion system 50 and/or the aircraft 10. For the embodiment depicted, the electrical communication bus 58 includes one or more electrical lines 60 connected to the electric generator 56, and for the embodiment depicted, extending through one or more of the outlet guide vanes 140.

It should also be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated, that in other exemplary embodiments, the turbofan engine 100 may instead be configured as any other suitable aircraft engine including a turbomachine and a propulsor. For example, in other embodiments, the turbofan engine 100 may instead be configured as a turboprop engine (i.e., the first propulsor may be configured as a propeller), an unducted turbofan engine (i.e., the gas turbine engine may not include the outer nacelle 238), etc.

Referring now particularly to FIGS. 1 and 3, the exemplary propulsion system 50 additionally includes the second propulsor assembly 54 mounted, or configured to be mounted, at a location away from the first propulsor assembly 52 (including, e.g., the turbomachine and the first propulsor) and to one of the first side 24 or second side 26 of the aircraft 10, e.g., to one of the first wing 20 or the second wing 22 of the aircraft 10. Notably, for the embodiment depicted in FIG. 1, the second propulsor assembly 54 is mounted to the second side 26 of the aircraft 10, or rather to the second wing 22 of the aircraft 10.

As shown in FIG. 3, the second propulsor assembly 54 is generally configured as an electrically driven fan and defines an axial direction $A_2$ extending along a longitudinal centerline axis 202 that extends therethrough for reference, as well as a radial direction $R_2$. Additionally, the second propulsor assembly 54 generally includes a second propulsor and a power supply. For the embodiment depicted, the second propulsor is also configured as a fan 204 rotatable about the centerline axis 202, and the power supply is configured as an electric motor 206. The fan 204 includes a plurality of fan blades 208 and a fan shaft 210. The plurality of fan blades 208 are attached to the fan shaft 210 and spaced generally along a circumferential direction of the second propulsor assembly 54 (not shown).

In certain exemplary embodiments, the plurality of fan blades 208 may be attached in a fixed manner to the fan shaft 210, or alternatively, the plurality of fan blades 208 may be rotatably attached to the fan shaft 210. For example, the plurality of fan blades 208 may be attached to the fan shaft 210 such that a pitch of each of the plurality of fan blades 208 may be changed, e.g., in unison, by a pitch change mechanism (not shown). Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

The fan shaft 210 is mechanically coupled to the electric motor 206. The electric motor 206 may be an inrunner electric motor, or alternatively may be an outrunner electric motor. In either embodiment, the electric motor 206 may further include a gearbox mechanically coupling the electric motor 206 to the fan shaft 210 (not shown). The electric motor 206 is in electrical communication with the electrical communication bus 58, which for the embodiment depicted includes one or more electrical lines 60 connected to the electric motor 206. The electrical communication bus 58 delivers power to the electric motor 206 for driving the electric motor 206, and in turn driving the fan 204.

However, it should be appreciated that the second propulsor assembly 54 depicted is provided by way of example only. For example, as is depicted in phantom, in certain embodiments, the second propulsor assembly 54 may include a fan casing or outer nacelle 212, attached to a core 214 of the second propulsor assembly 54 through one or more struts or outlet guide vanes 216.

Referring again particularly to FIG. 1, as previously discussed, the propulsion system 50 includes the electrical communication bus 58, which as shown, electrical connects the electric generator 56 and the second propulsor assembly 54. More particularly, the electrical communication bus 58 includes one or more electrical lines 60 connecting the electric generator 56 (see FIG. 2) and the electric motor 206 of the second propulsor assembly 54 (see FIG. 3). Accordingly, the electric generator 56 of the propulsion system 50 is in electrical communication with the second propulsor assembly 54 through the electrical communication bus 58 for powering the second propulsor assembly 54.

Moreover, referring still to the exemplary embodiment depicted in FIG. 1, the propulsion system 50 additionally includes a power storage device 62 in electrical communication with both the electric generator 56 and the electric motor 206 of the second propulsor assembly 54. In certain exemplary embodiments, the power storage device 62 may include one or more batteries or other suitable device for storing electrical power. Additionally, for the embodiment depicted, the power storage device 62 is mounted within, or configured to be mounted within, the second wing 22 of the aircraft 10. It should be appreciated that the power storage device 62, if included, may be electrically connected to the electric generator 56 and the electric motor 206 in any suitable manner. For example, in certain embodiments, the electric generator 56, power storage device 62, and electric motor 206 may be arranged in series flow, such that the electric motor 206 is in electrical communication with the electric generator 56 through the power storage device 62. Alternatively, in other embodiments, the power storage device 62 may be in parallel flow communication with the electric generator 56 and the electric motor 206.

A propulsion system in accordance with one or more of the above embodiments may be referred to as an asymmetric, gas-electric propulsion system, given that a first propulsor assembly is configured as a turbofan engine mounted to a first side of an aircraft and a second propulsor assembly is configured as an electrically driven fan mounted to a second side of the aircraft. Such a configuration may allow for a single, relatively large engine to power two or more propulsors (which may be configured as, e.g., fans, propellers, etc.). Accordingly, a propulsion system in accordance with one or more embodiments of the present disclosure may allow for inclusion of a relatively large engine, which may in turn allow for an engine having increased efficiencies (as compared to relatively small engines).

Additionally, given that the propulsion system 50 may be configured as an asymmetric propulsion system 50, the propulsion system 50 may include features for offsetting any weight imbalances. Specifically, the propulsion system 50 may initially have an imbalanced weight distribution given that the first propulsor assembly 52 is configured as a turbofan engine while the second propulsor assembly 54 is configured as an electrically driven fan 204. For example, mounting the power storage device 62 on the second side of the aircraft 10 (e.g., within the second wing 22 of the aircraft 10) may assist with offsetting initial weight imbalances due to the differing configurations of the first and second propulsor assemblies 52, 54.

Moreover, inclusion of a power storage device 62 in accordance with an exemplary embodiment of the present disclosure may provide for additional redundancies in the propulsion system 50. For example, inclusion of the power storage device 62 may allow for at least one of the propulsor assemblies 52, 54 to operate in the event of an electrical failure of the propulsion system 50, and may also allow for at least one of the propulsion assemblies 52, 54 to operate in the event of a mechanical failure of the propulsion system 50. Particularly for the embodiment depicted above, the first propulsor assembly 52, configured as a turbofan engine, may operate in the event of an electrical failure of the propulsion system 50, and conversely, the second propulsor assembly 54, configured as an electrically driven fan, may operate in the event of a mechanical failure of the propulsion system 50 (powered in such an event by, e.g., the power storage device 62). Furthermore, in instances wherein the electric generator 56 is also capable of functioning as an electric motor, the first propulsor of the first propulsor assembly 52 may also be capable of operating during situations wherein the core turbine engine 102 is not operating (e.g., during certain mechanical failures of the first propulsor assembly 52).

It should be appreciated, however, that the exemplary aircraft 10 and propulsion system 50 depicted in FIGS. 1 through 3 are provided by way of example only, and in other embodiments, the aircraft 10 and/or propulsion system 50 may have any other suitable configuration. For example, in other exemplary embodiments, the first propulsor assembly 52 and second propulsor assembly 54 may instead be mounted to, e.g., opposing sides of the fuselage 12, e.g., at the aft end 18 of the aircraft 10. Additionally, or alternatively, in other embodiments, the exemplary propulsion system 50 may include additional propulsor assemblies. For example, in other embodiments, the exemplary propulsion system 50 may include a third propulsor assembly configured as an electrically driven fan 204 mounted in any other suitable location. Furthermore, in still other embodiments, the exemplary propulsion system 50 may include the first and second propulsor assemblies (configured as a turbofan engine and an electrically driven fan 204, respectively) mounted to one side of the aircraft 10, and may additionally include a third propulsor assembly and a fourth propulsor assembly (configured, e.g., as a turbofan engine and electrically driven fan 204, respectively) mounted to another side of the aircraft 10.

Figure 4:
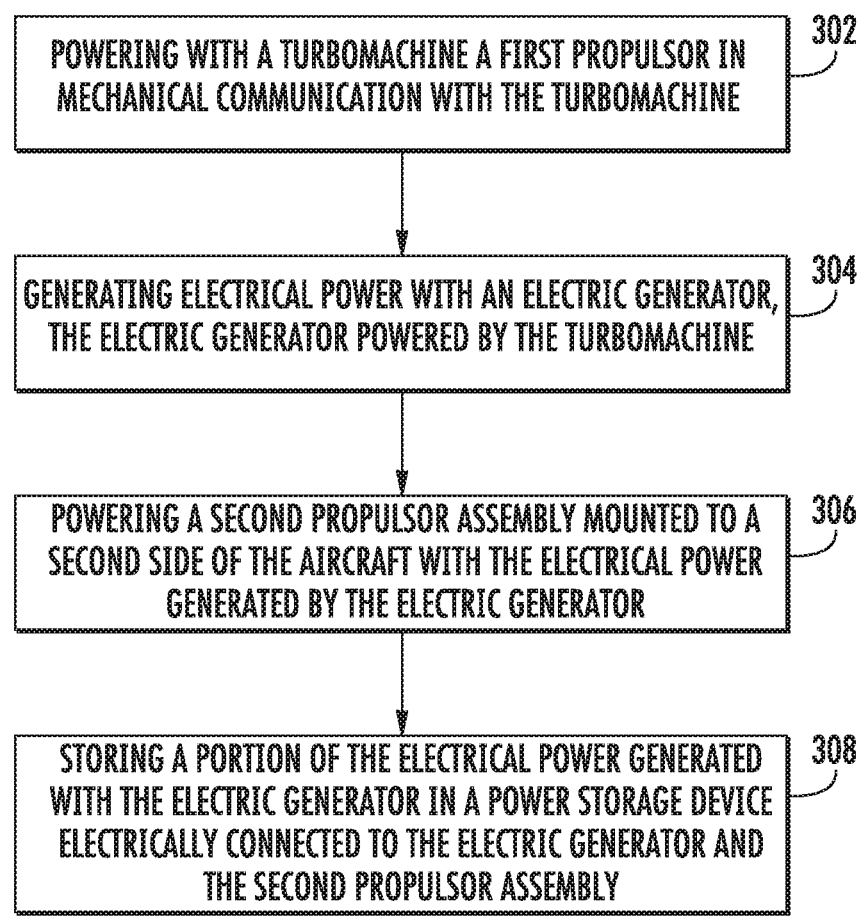
FIG. 4 is a flow diagram of a method for operating a propulsion system of an aircraft.

Referring now to FIG. 4, a flow diagram of a method (300) for operating a propulsion system of an aircraft is provided. The exemplary method (300) may be utilized with one or more embodiments of the exemplary propulsion system 50 described above with reference to FIGS. 1 through 3.

For the exemplary aspect depicted, the exemplary method (300) includes at (302) powering with a turbomachine a first propulsor in mechanical communication with the turbomachine. The turbomachine may be mounted to a first side of the aircraft. The exemplary method (300) additionally includes at (304) generating electrical power with an electric generator. The electric generator may be powered by and in mechanical communication with the turbomachine. Further, the exemplary method (300) includes at (306) powering a second propulsor assembly mounted to a second side of the aircraft with the electrical power generated by the electric generator at (302). In certain exemplary aspects, the second propulsor assembly may generally include a second propulsor, such as a fan or propeller, and an electric motor. With such an exemplary aspect, powering the second propulsor assembly at (306) may include powering the electric motor, which in turn drives the second propulsor.

Additionally, for the exemplary aspect depicted, the exemplary method (300) includes at (308) storing a portion of the electrical power generated with the electric generator at (304) in a power storage device. The power storage device may be electrically connected to the electric generator and the second propulsor assembly. In certain exemplary aspects, the power storage device may include, e.g., one or more batteries or other suitable devices for storing electrical energy. The power storage device may be configured to provide the second propulsor assembly electrical power when, e.g., the electric generator is generating little or no electrical power, such as during the event of a mechanical failure of the turbomachine. Additionally or alternatively, the power storage device may be configured to provide the second propulsor assembly electrical power during events of high-power demand from the aircraft. Furthermore, in certain embodiments, the power storage device may be configured to provide electrical power back to the electric generator, which in certain embodiments may be capable of functioning as an electric motor. With such a configuration, the power storage device may provide power to the electric generator/motor, such that the electric generator/motor may drive the first propulsor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft comprising a first wing and a second wing, the propulsion system comprising:
   an electric generator;
   a turbomachine configured to be mounted to the first wing of the aircraft and comprising a turbine section and a shaft, the shaft rotatable with at least a portion of the turbine section, the turbomachine operable with the electric generator;
   a first propulsor mechanically coupled to the shaft of the turbomachine; and
   a second propulsor assembly configured to be mounted to the second wing at a location away from the turbomachine and the first propulsor, the electric generator in electrical communication with the second propulsor assembly for powering the second propulsor assembly, wherein the second propulsor assembly further includes an electric motor.

2. The propulsion system of claim 1, wherein the first propulsor is a fan, and wherein the turbomachine and the fan together form a turbofan engine.

3. The propulsion system of claim 1, wherein the second propulsor assembly includes a second propulsor, and wherein the second propulsor is configured as a fan.

4. The propulsion system of claim 1, wherein the turbomachine includes a power gearbox, and wherein the first propulsor is mechanically coupled to the shaft of the turbomachine through the power gearbox.

5. The propulsion system of claim 1, wherein the second propulsor assembly is configured to be mounted to the second wing of the aircraft.

6. The propulsion system of claim 1, further comprising:
a power storage device in electrical communication with both the electric generator and the second propulsor assembly.

7. The propulsion system of claim 6, wherein the power storage device is configured to be mounted within the second wing of the aircraft.

8. The propulsion system of claim 1, wherein the electric generator is positioned within the turbomachine.

9. An aircraft comprising:
a fuselage, a first wing, and a second wing, the first wing and a portion of the fuselage defining a first side, and the second wing and another portion of the fuselage defining a second side; and
an asymmetric propulsion system comprising
an electric generator;
a turbomachine mounted to the first side of the aircraft, the turbomachine comprising a turbine section and a shaft, the shaft rotatable with at east a portion of the turbine section, the turbomachine operable with the electric generator;
a first propulsor mechanically coupled to the shaft of the turbomachine; and
a second propulsor assembly, including an electric motor, mounted to the second side, the electric generator in electrical communication with the electric motor for powering the second propulsor assembly.

10. The aircraft of claim 9, wherein the turbomachine is mounted to the first wing of the aircraft, and wherein the second propulsor assembly is mounted to the second wing of the aircraft.

11. The aircraft of claim 9, wherein the first propulsor is a fan, and wherein the turbomachine and the fan together form a turbofan engine.

12. The aircraft of claim 9, wherein the second propulsor assembly includes a second propulsor, and wherein the second propulsor is configured as a fan.

13. The aircraft of claim 9, wherein the turbomachine includes a power gearbox, and wherein the first propulsor is mechanically coupled to the shaft of the turbomachine through the power gearbox.

14. The aircraft of claim 9, wherein further comprising:
a power storage device in electrical communication with both the electric generator and the second propulsor assembly.

15. The aircraft of claim 14, wherein the power storage device is mounted within the second wing of the aircraft.

16. The aircraft of claim 9, wherein the electric generator is positioned within the turbomachine.

17. A method for operating a propulsion system of an aircraft comprising:
powering, with a turbomachine mounted to a first side of the aircraft, a first propulsor in mechanical communication with the turbomachine;
generating electrical power with an electric generator powered by the turbomachine; and
powering an electric motor included in a second propulsor assembly mounted to a second side of the aircraft with the electrical power generated by the electric generator.

18. The method of claim 17, further comprising:
storing a portion of the electrical power generated with the electric generator in a power storage device electrically connected to the electric generator and the second propulsor assembly.

19. The propulsion system; of claim 7, wherein the power storage device is configured to be mounted within the second wing of the aircraft to offset initial weight imbalances between the first and second propulsor assemblies.

20. The aircraft of claim 15, wherein the power storage device is mounted within the second wing of the aircraft to offset weight imbalances between the first and second propulsor assemblies.

* * * * *